PHASE LOCK DEMODULATOR

Filed Dec. 21, 1966 3 Sheets-Sheet 1

INVENTOR.
CHARLES E. WHEATLEY III
BY
ATTORNEY

INVENTOR.
CHARLES E. WHEATLEY III
BY Roger M. Pitts
ATTORNEY

INVENTOR.
CHARLES E. WHEATLEY III
BY [signature]
ATTORNEY

United States Patent Office 3,465,258
Patented Sept. 2, 1969

3,465,258

PHASE LOCK DEMODULATOR

Charles E. Wheatley III, Manhattan Beach, Calif., assignor to North American Rockwell Corporation, a corporation of Delaware Filed Dec. 21, 1966, Ser. No. 603,500
Int. Cl. H03d *3/18*
U.S. Cl. 329—122 8 Claims

ABSTRACT OF THE DISCLOSURE

The subject invention relates to phase-modulated communication systems employing a bi-polar demodulator having a phase-locked loop, and more particularly to a bi-phase demodulator employing double side-band suppressed carrier modulation for phase-doubling the phase error to which the phase-lock control loop responds.

Background of the invention

In a binary-coded, phase-modulated carrier communication system, recovery of the encoded intelligence or phase-coded modulation is conventionally effected by a bi-phase demodulator-receiver. The general arrangement of such receiver employs a phase-sensitive detector in cooperation with a phase-locked reference signal source or voltage-controlled local oscillator. Phase-locked loops synchronize the phase (and frequency) of the local oscillator to the center frequency of the received, binary phase-modulated carrier, while the phase detector provides an output signal having a component which changes state in response to changes in the phase of the received signal. The general arrangement and operation of a typical phase-lock receiver is discussed in an article by R. Jaffe and E. Rechtin on page 66 of the March 1955 issue of the IRE Transactions on Information Theory. Various types of such arrangements are also described in the following U.S. patents:

2,871,349, Jan. 27, 1959, J. M. Shapiro; 2,984,701, May 16, 1961, G. H. Barry; 3,008,124, Nov. 7, 1961, J. T. Warnock; 3,028,487, Apr. 3, 1962, F. A. Losee; 3,037,079, May 29, 1962, C. A. Crafts; 3,078,344, Feb. 19, 1963, C. A. Crafts et al.; 3,099,796, July 30, 1963, S. Zadoff; 3,109,143, Oct. 29, 1963, N. P. Gluth; 3,110,862, Nov. 12, 1963, N. E. Chasek; 3,112,448, Nov. 26, 1963, M. D. McFarlane et al.; 3,119,964, Jan. 28, 1964, C. A. Crafts; 3,181,122, Apr. 27, 1965, L. R. Brown; 3,189,825, June 15, 1965, A. W. Lahti et al.; 3,189,826, June 15, 1965, E. M. Mitchell et al.; 3,204,185, Aug. 31, 1965, L. M. Robinson.

In general, such prior art provides examples of one or more of the following disadvantages and limitations: a complexity of equipment and multiple control loops are employed by some systems, resulting in high maintenance, low reliability and high cost; tuned filter circuits are employed with frequency multipliers in some system, resulting in poor phase-control performance due to the phase response limitations of such tuned circuits. Such response limitations correspond to a bandwidth limitation which limits the bit-rate at which binary phase-coded information can be handled by the phase-lock loop. The conventional phase-lock loop has another shortcoming, in that for initial phase-errors as large as 180°, the phase lock signal is small (being a sinusoidal function of the phase error); thus, the rate of lock-in for an initial out-of-phase condition approximately 180° is relatively slow.

Summary of the invention

By means of the concept of the subject invention, the above-noted disadvantages and limitations of the prior art are avoided and a phase-lock loop of reduced complexity and improved performance is achieved.

In a preferred embodiment of the invention, there is provided a bi-phase demodulator comprising a first and second phase-sensitive detector, a first input of each of such detectors being commonly connected to define an input terminal of the demodulator; a voltage-controlled oscillator, a control input of which is low-pass coupled to an output of the first detector, and the output of which is applied to a second input of each of the detectors, the two inputs of one of the input pairs of the first inputs and the second inputs of the detectors being in mutual time-phase quadrature relationship. A balanced modulator is interposed between the output of the voltage-controlled oscillator and an input to one of the phase-sensitive detectors, a second input of the modulator being low-pass coupled to an output of the other of the phase sensitive detectors.

By means of the above-described arrangement of the balanced modulator in the phase-lock loop, phase-angle doubling is accomplished for increased phase-lock loop sensitivity, and extended range of performance. Also, the use of phase-sensitive detectors in lieu of frequency doublers and associated tuned circuits, avoids the limited phase response associated with the use of such tuned circuits. Further, because of the increased phase-sensitivity and extended phase-error performance range, and avoidance of tuned circuit elements, fewer components are employed and complex compensatory and ancillary control loops are avoided. Accordingly, it is a broad object of the invention to provide an improved bi-phase demodulator.

It is another object of the invention to provide a phase-lock demodulator having improved performance.

It is yet another object to provide a bi-phase demodulator having a phase-lock loop of reduced complexity.

A further object of the invention is to provide a bi-phase demodulator with a phase-lock loop having both reduced complexity and improved performance.

Still a further object of the invention is to provide a phase-lock loop having a wide band response for handling increased bit-rates of binary phase-coded information.

These and other objects of the invention will become apparent from the drawings in which:

Briefs description of the drawings

In the drawings, like reference characters refer to like parts.

Description of the preferred embodiments

Figure 1:
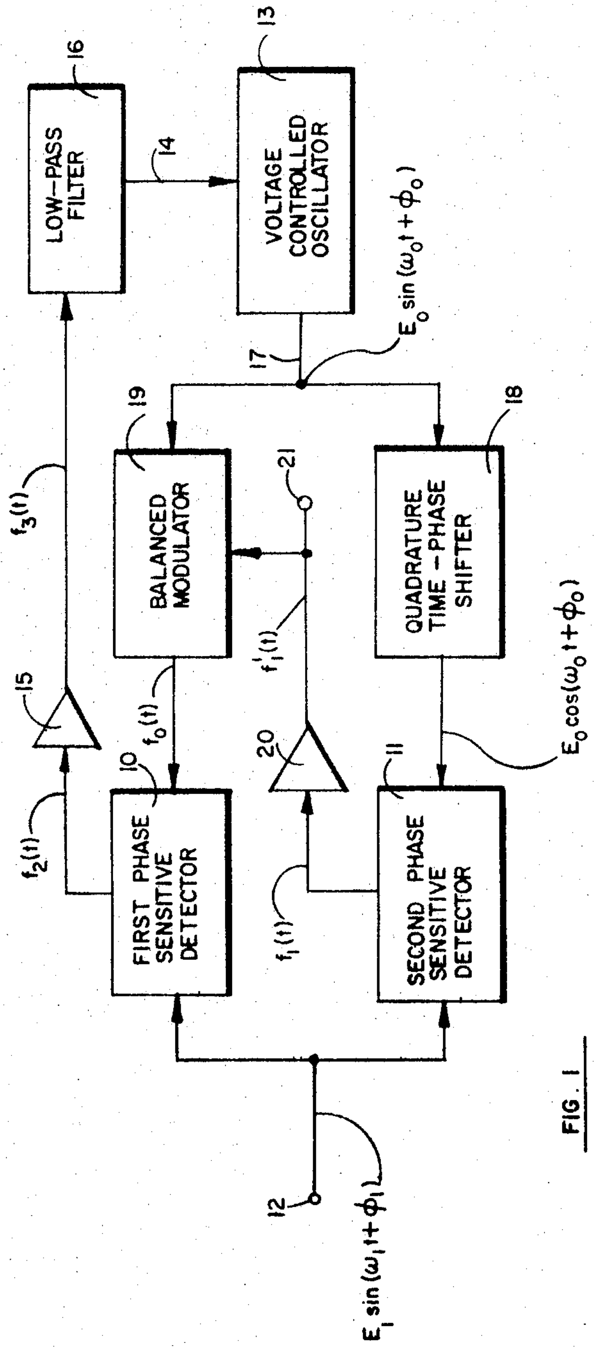
FIG. 1 is a block diagram of a system embodying the concept of the invention.

Referring now to FIG. 1, there is illustrated in block diagram form a preferred embodiment of the invention. There is provided a biphase demodulator comprising a first and a second phase sensitive detector 10 and 11, a first input of each of detectors 10 and 11 being coupled to form a single common input terminal 12. There is also provided a voltage-controlled oscillator (VCO) 13, a control input 14 of which is low-pass coupled to an output of first detector 10 by means of a first D-C amplifier 15 and low-pass filter 16. The transfer function characteristic of filter 16 may also include compensatory signal-sharing, if required, for closed-loop stability considerations, as is well understood in feed back systems design. Although amplifier 15 and filter 16 have been illustrated as separate elements, it is readily understood to those skilled in the art that such functions may be combined in a single circuit. The output 17 of VCO 13 is operatively coupled to a second input of each of phase-sensitive detectors 10 and 11 in mutually time-phase quadrature relationship. Such quadrature time-phase relationship may be provided by means of a phase-shifter 18 interposed between the output 17 of VCO 13 and the associated input of second detector 11, as shown in FIG. 1. A balanced modulator 19 is interposed between the output 17 of VCO 13 and the second input of first detector 10, and responsively coupled to an output of second detector 11 by means of a low-pass filtered D-C amplifier 20 or the like. Each of the elements of FIG. 1 has been shown in only block form, the construction and arrangement of such elements being well understood in the art.

In normal operation of the illustrated arrangement of FIG. 1, VCO 13 is caused to track the center frequency and phase of a single frequency IF carrier applied at input terminal 12. The use of low-pass filter coupling provides tracking of the average frequency, center frequency of carrier frequency of a phase-modulated carrier, while the illustrated cooperation of balanced modulator 19 results in phase-doubling of the phase-error signal employed in the phase-tracking loop (elements 10, 11 and 13) to provide improved performance thereof.

The control signal applied to the second input of first detector 10 is derived by multiplying the output of VCO 13 with the low-frequency portion of the output of second phase-sensitive detector 11. Such control signal, the output $f_0(t)$ of balanced modulator 19 of FIG. 1, may be expressed as:

$$f_0(t)=E_0 \sin(\omega_0 t+\phi_0)Kf_1't \quad (1)$$

where:

$Kf_1'(t)$=low-pass filtered output of second detector 11 and $E_0 \sin(\omega_0+\phi_0)$=output of VCO 13

The unfiltered output $f_1(t)$ of second phase detector 11 of FIG. 1 may be expressed as:

$$f_1(t)=E_0E_1 \cos(\omega_0 t+\phi_0)\sin(\omega_1 t+\phi_1) \quad (2)$$

where:

$E_0 \cos(\omega_0 t+\phi_0)$=phase-shifted output of phase shifter 18 and $E_1 \sin(\omega_1 t+\phi_1)$=receiver IF input applied to terminal 12.

Considering the following trigonometric identities for the sum and difference of two angles, X and Y:

$$\sin(X+Y)=\sin X\cos Y+\cos X\sin Y \quad (3)$$

$$\sin(X-Y)=\sin X\cos Y-\cos X\sin Y \quad (4)$$

and differentially combining Equations 3 and 4:

$$\sin(X+Y)+\sin(X-Y)=2\sin X\cos Y \quad (5)$$

Letting:

$$X=(\omega_1 t+\phi_1)$$

and $$Y=(\omega_0 t+\phi_0)$$

and substituting Equation 5 in Equation 2:

$$f_1(t)=\frac{E_0E_1}{2}\sin[(\omega_1+\omega_0)t+(\phi_1+\phi_0)]+\frac{E_0E_1}{2}\sin[(\omega_1-\omega_0)t+(\phi_1-\phi_0)] \quad (6)$$

Low pass filtering of the $f_1(t)$ signal, by element 20 in FIG. 1, to retain only the low frequency component thereof, $Kf_1'(t)$:

$$Kf_1'(t)=\frac{kE_0E_1}{2}\sin[(\omega_1-\omega_0)t+(\phi_1-\phi_0)] \quad (7)$$

where:

$k$=static gain term resulting from the low pass filtering process.

The cut-off, or corner, frequency $\omega_{c0}$ of the passband of such low pass filtering is selected to be intermediate the indicated sum and difference frequencies. In other words, $(\omega_1-\omega_0)<\omega_{c0}<(\omega_1+\omega_0)$. For example, a low pass filter cut-off frequency less than the receiver intermediate frequency $(\omega_{c0}<\omega_1)$ would suffice for element 20.

Substituting Equation 7 in Equation 1, the output of $f_0(t)$ of balanced modulator 19 in FIG. 1 may be written as:

$$f_0(t)=KE_0\sin(\omega_0 t+\phi_0)\sin[(\omega_1-\omega_0)t+(\phi_1-\phi_0)] \quad (8)$$

Such signal, applied as a second input to first phase detector 11 of FIG. 1, results in an output signal therefrom, $f_2(t)$:

$$f_2(t)=f_0(t)\sin(\omega_0 t+\phi_0) \quad (9)$$

Substituting Equation 8 in Equation 9:

$$f_2(t)=KE_0\sin(\omega_0 t+\phi_0)\sin[(\omega_1-\omega_0)t+(\phi_1-\phi_0]\sin(\omega_1 t+\phi_1) \quad (10)$$

Expanding Equation 10 by first treating the component product, $\sin(\omega_0 t+\phi_0)\sin(\omega_1 t+\phi_1)$, consider the identities:

$$\cos(X+Y)=\cos X\cos Y-\sin X\sin Y \quad (11)$$

$$\cos(X-Y)=\cos X\cos Y+\sin X\sin Y \quad (12)$$

Differentially combining Equations 11 and 12:

$$\cos(X-Y)-\cos(X+Y)=2\sin X\sin Y \quad (13)$$

Letting: $X=(\omega_1 t+\phi)$, and $Y=(\omega_0 t+\phi_0)$ and rearranging Equation 13:

$$\sin(\omega_1 t+\phi_1)\sin(\omega_0 t+\phi_0)=\tfrac{1}{2}\cos[(\omega_1-\omega_0)t+(\phi_1-\phi_0)]-\tfrac{1}{2}\cos[(\omega_1+\omega_0)t+(\phi_1+\phi_0)] \quad (14)$$

Substituting Equation 14 in Equation 10:

$$f_2(t)=\frac{KE_0}{2}\left\{\cos[(\omega_1-\omega_0)t+(\phi_1-\phi_0)]-\cos[(\omega_1+\omega_0)t+(\phi_1+\phi_0)]\right\}\sin[(\omega_1-\omega_0)t+(\phi_1-\phi_0)] \quad (15)$$

Employing the identities:

$$\cos A\sin A=\tfrac{1}{2}\sin 2A \quad (16)$$

$$\cos B\sin A=\tfrac{1}{2}\sin(A+B)+\tfrac{1}{2}\sin(A-B) \quad (17)$$

where:

$$A=[(\omega_1-\omega_0)t+(\phi_1-\phi_0)]$$

$$B=[(\omega_1+\omega_0)t+(\phi_1+\phi_0)]$$

and rearranging Equation 15:

$$f_2(t)=\frac{KE_0}{4}\sin[2(\omega_1-\omega_0)t+2(\phi_1-\phi_0)]-\frac{KE_0}{4}[\sin(2\omega_1+2\phi_1)-\sin(2\omega_0+2\phi_0)] \quad (18)$$

By low pass filtering the signal $f_2(t)$ with filter 16, using a cut-off or corner frequency $\omega'_{c0}$ less than either of $2\omega_0$ or $2\omega_1$, the low frequency term of Equation 18 is retained. For example, a low pass filter corner frequency less than the receiver IF frequency $\omega_1$ would suffice. Such low pass filtered component, $f_3(t)$ may be written from Equation 18 as:

$$f_3(t)=\frac{KE_0}{4}\sin 2(\omega_1-\omega_0)t+2(\phi_1-\phi_0) \qquad (19)$$

Accordingly, the phase loop error control signal, $f_3(t)$, applied as a control signal to voltage controlled oscillator 13, is seen to have a respective frequency and phase corresponding to twice the frequency difference and phase difference, respectively, of the phase loop error, itself.

Figure 3:
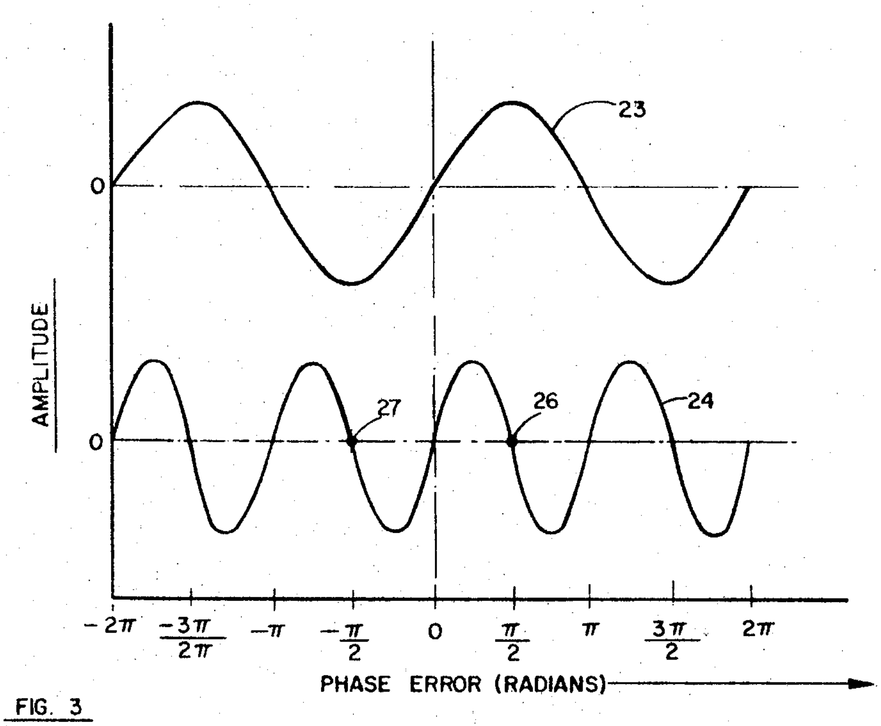
FIG. 3 is a family of response curves illustrating the low-pass filtered responses of the phase detectors of FIG. 1 as functions of phase angle in a linear mode of operation of the system of FIG. 1.

From an examination of Equation 7, it is clear that the D-C envelope of the demodulator output on terminal 21 (in FIG. 1) will be periodic, or sinusoidal, function of phase-angle error, $$f_1'(DC)=k\frac{E_0E_1}{2}\sin(\phi_1-\phi_0)$$

as shown by curve 23 in FIG. 3. The positive sense of curve 23 (corresponding to a positive polarity output on terminal 21 in FIG. 1) represents a binary "1" phase code, for example, while the negative sense portions of curve 23 correspond to a binary phase "0."

The phase-doubled input to VCO 13 of FIG. 1 (associated with the frequency doubling achieved by the illustrated cooperation of modulator 19 in FIG. 1 and corresponding to Equation 19) is also a periodic function, or sinusoidal function of phase error: $f_3'(DC)=\sin 2(\phi_1-\phi_0)$, the periodicity or frequency of such function being twice that of $f_1'$(DC), as illustrated by curve 24 in FIG. 3.

A stable phase lock point at which VCO 13 (of the phaselock loop of FIG. 1) locks onto an input, applied at terminal 12, for a "1" code or positive phase angle perturbation, is represented by the odd-valued function about point 26 in FIG. 3, while point 27 represents a stable phase lock point for a negative phase angle perturbation of "0" code. A region of maximum sensitivity (volts per radian) on curve 24 for stable control, lies in the region between $+\pi/4$ and $+3\pi/4$ on either side of point 26 (at $+\pi/2$) and in the region between $-\pi/4$ and $-3\pi/4$ on either side of point 27 (at $-\pi/2$).

The reduced magnitude of the phase-control response (curve 24 in FIG. 3) in the regions of $-\pi$ and $+\pi$ does not assure a fast loop response to phase shift errors of $\mp\pi$ radians (or $\mp180°$) in such illustrated linear mode of operation of the system of FIG. 1.

Figure 4:
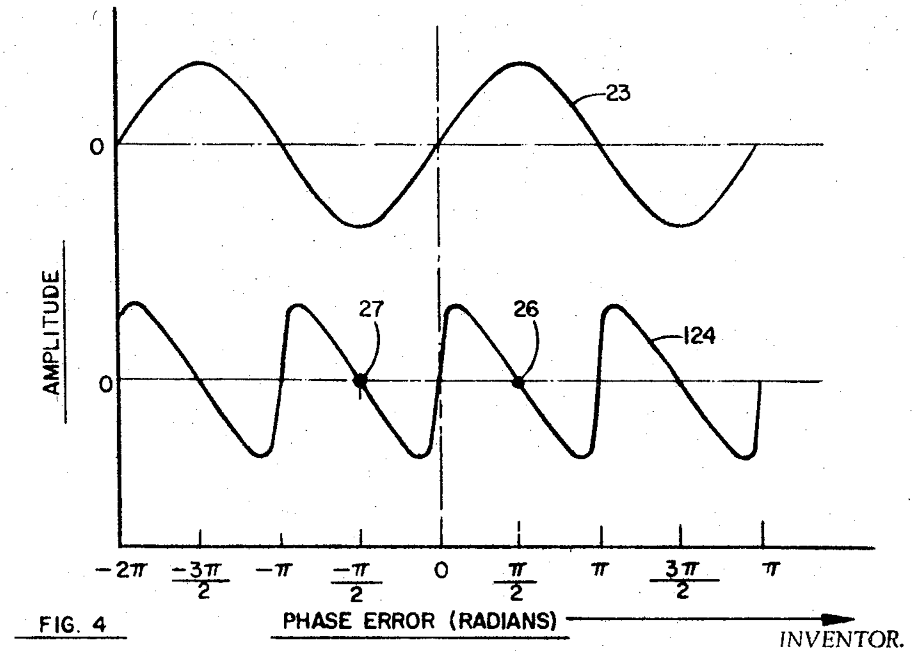
FIG. 4 is a family of response curves illustrating the responses of the phase detectors of FIG. 1 as functions of phase-angle in a non-linear mode of operation of the system of FIG. 1.

If, however, the D-C gain of element 20 in FIG. 1 is increased sufficiently to effect control loop gain saturation (a non-linear mode of operation), then the shape of the phase control response as a function of phase shaft error is modified, as shown by curve 124 in FIG. 4. In such non-linear mode, at phase errors near $\mp\pi$, a higher gain is provided that in the linear mode (curve 24 in FIG. 3 near $\mp\pi$). Such improved gain near, but not at, $\mp\pi$ for curve 124 in FIG. 4, occurs because the amplitude of the reference signal $f_0(t)$ at loop phase detector 10 is a constant amplitude, while having a phase determined by the input signal, $E_1 \sin(\omega_1 t+\phi)$, on terminal 12. In such non-linear mode of operation, much more rapid rates of phase lock-on can be achieved for phase shift errors as high as $\mp178°$, than can be obtained by the conventional or linear mode of operation. Ideally, a square-wave D-C wave shape is to be desired for the D-C output of amplifier 20 as a function of phase error, which function may be obtained by high gain amplification and signal clipping, as is well understood in the art.

Because of the avoidance of highly tuned circuits and the increased lock-on rate of the described bi-phase demodulator, a wide band device is achieved which can handle higher bit rates of binary-coded phase modulation.

Figure 2:
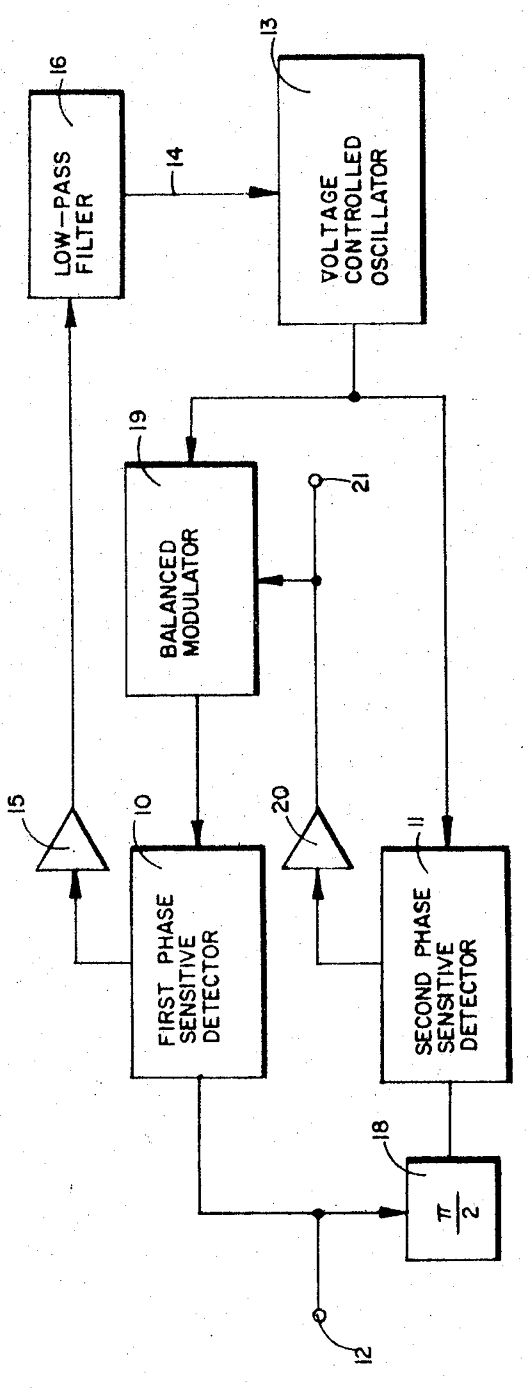
FIG. 2 is a block diagram of an alternate embodiment of the invention.

Although the embodiment of FIG. 1 has been described and illustrated as employing a quadrature phase-shifter 18 at the input to second detector 11, it is readily apparent that the concept of the invention is not so limited and that such phase-shifter may be interposed between the output of VCO 13 and the associated input to modulator 19. Alternatively, a quadrature phase-shifter 18 could be interposed between input terminal 12 and the associated input to either one of detectors 10 and 11, as shown in FIG. 2.

Accordingly, there has been described an improved phase-locked loop detector having a wide bandwidth response and improved lock-in performance.

Although the invention has been illustrated and described in detail, it is to be clearly understood that the same is not by way of limitation.

I claim:

1. A phase-lock demodulator, comprising a first and a second phase-sensitive detector, a first input of each of said detectors being commonly connected to define an input terminal of said demodulator;

a voltage controlled oscillator, a control input of which is low-pass coupled by low-pass means to an output of said first phase-sensitive detector, and the output of which is applied to a second input of each of said phase sensitive detectors in mutually time-phase quadrature relationship by phase shift means; and a balanced modulator interposed between the output of said voltage controlled oscillator and an input to one of said phase-sensitive detectors and responsive to an output of the other of said detectors.

2. The device of claim 1 in which said modulator is low-pass coupled to the output of the other of said detectors.

3. The device of claim 2 in which said low-pass coupling of said modulator is high-gain clipped by signal clipping means.

4. A phase-lock demodulator, comprising a first and second phase-sensitive detector, a first input of each of said detectors being coupled to a single common input terminal of said demodulator;

a voltage-controlled oscillator, a control input of which is low-pass coupled by low-pass means to an output of said first phase-sensitive detector, and the output of which is applied to a second input of each of said phase-sensitive detectors, the two inputs of one of the input pairs of said first inputs and said second inputs of said phase-sensitive detectors being in mutual time phase quadrature relationship by phase shift means; and a balanced modulator interposed between the output of said voltage-controlled oscillator and an input to one of said phase-sensitive detectors, a second input of the modulator being coupled to an output of the other of the phase-sensitive detectors.

5. The device of claim 4 in which the first inputs to said phase-sensitive detectors are mutually in-phase and in which the second inputs thereto from said oscillator are in mutual time-phase quadrature relation.

6. The device of claim 4 in which the first inputs to said detectors are in mutual time-phase quadrature relationship and in which the second inputs thereto from said oscillator are mutually in-phase.

7. The device of claim 4 in which said coupled second input of said modulator is low-pass coupled by low pass coupling means.

8. The device of claim 4 in which said coupled second input of said second input of said modulator is low-pass coupled and amplitude-clipped by low-pass coupling and amplitude clipping means.

References Cited

UNITED STATES PATENTS

| | | | |
|---|---|---|---|
| 3,163,823 | 12/1964 | Kellis et al. | 325—419 X |
| 3,199,037 | 8/1965 | Graves. | |
| 3,218,557 | 11/1965 | Sanders | 325—419 X |
| 3,295,127 | 12/1966 | Kross | 325—419 X |

ALFRED L. BRODY, Primary Examiner

U.S. Cl. X.R.

329—50; 328—133, 155; 325—49, 329, 419